US011495237B2

(12) United States Patent
Norvell et al.

(10) Patent No.: US 11,495,237 B2
(45) Date of Patent: Nov. 8, 2022

(54) SUPPORT FOR GENERATION OF COMFORT NOISE, AND GENERATION OF COMFORT NOISE

(71) Applicant: Telefonaktiebolaget LM Ericsson (publ), Stockholm (SE)

(72) Inventors: Erik Norvell, Upplands Väsby (SE); Fredrik Jansson, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/044,740

(22) PCT Filed: Apr. 5, 2019

(86) PCT No.: PCT/EP2019/058629
§ 371 (c)(1),
(2) Date: Oct. 1, 2020

(87) PCT Pub. No.: WO2019/193149
PCT Pub. Date: Oct. 10, 2019

(65) Prior Publication Data
US 2021/0090582 A1 Mar. 25, 2021

Related U.S. Application Data

(60) Provisional application No. 62/653,078, filed on Apr. 5, 2018, provisional application No. 62/652,941, filed
(Continued)

(51) Int. Cl.
*G10L 19/012* (2013.01)
*G10L 19/008* (2013.01)
(Continued)

(52) U.S. Cl.
CPC .......... *G10L 19/012* (2013.01); *G10L 19/008* (2013.01); *G10L 19/0017* (2013.01);
(Continued)

(58) Field of Classification Search
CPC ... G10L 19/008; G10L 19/012; G10L 19/032; G10L 19/167; G10L 19/0204;
(Continued)

(56) References Cited

U.S. PATENT DOCUMENTS 9,865,274 B1 1/2018 Vicinus et al.
2004/0002856 A1* 1/2004 Bhaskar ............... G10L 19/097
704/219
(Continued)

FOREIGN PATENT DOCUMENTS

WO 2015/122809 A1 8/2015

OTHER PUBLICATIONS

International Search Report and Written Opinion issued in International Application No. PCT/EP2019/058629 dated Jul. 8, 2019 (11 pages).

Primary Examiner — Alexander Krzystan
(74) Attorney, Agent, or Firm — Rothwell, Figg, Ernst & Manbeck, P.C.

(57) ABSTRACT

A method for generation of comfort noise for at least two audio channels. The method comprises determining a spatial coherence between audio signals on the respective audio channels, wherein at least one spatial coherence value per frame and frequency band is determined to form a vector of spatial coherence values. A vector of predicted spatial coherence values is formed by a weighted combination of a first coherence prediction and a second coherence prediction that are combined using a weight factor a. The method comprises signaling information about the weight factor a to the receiving node, for enabling the generation of the comfort noise for the at least two audio channels at the receiving node.

23 Claims, 5 Drawing Sheets

Related U.S. Application Data on Apr. 5, 2018, provisional application No. 62/652,949, filed on Apr. 5, 2018.

(51) Int. Cl.
| | | |
|---|---|---|
| *G10L 19/032* | (2013.01) | |
| *G10L 19/04* | (2013.01) | |
| *G10L 19/06* | (2013.01) | |
| *G10L 19/00* | (2013.01) | |
| *H04W 76/28* | (2018.01) | |

(52) U.S. Cl.
CPC ............ *G10L 19/032* (2013.01); *G10L 19/04* (2013.01); *G10L 19/06* (2013.01); *H04W 76/28* (2018.02)

(58) Field of Classification Search
CPC ..... G10L 19/02; H04S 3/008; H04S 2420/03; H04S 2420/07

USPC ............................................ 381/73.1, 23, 22
See application file for complete search history.

(56) References Cited

U.S. PATENT DOCUMENTS

| | | | |
|---|---|---|---|
| 2005/0154584 A1* | 7/2005 | Jelinek | G10L 19/005 704/219 |
| 2014/0211966 A1* | 7/2014 | Hetherington | G10K 11/17885 381/94.3 |
| 2015/0181018 A1* | 6/2015 | Mani | H04M 9/082 379/406.08 |
| 2015/0249892 A1* | 9/2015 | Kuhnel | H04R 25/552 381/315 |
| 2017/0047072 A1 | 2/2017 | Eriksson | |
| 2018/0205830 A1* | 7/2018 | Wells-Rutherford | G10L 21/02 |
| 2018/0240471 A1* | 8/2018 | Markovich Golan | G10L 21/0232 |

\* cited by examiner

SUPPORT FOR GENERATION OF COMFORT NOISE, AND GENERATION OF COMFORT NOISE

CROSS REFERENCE TO RELATED APPLICATION(S)

This application is a 35 U.S.C. § 371 National Stage of International Patent Application No. PCT/EP2019/058629, filed Apr. 5, 2019, designating the United States and claiming priority to the following three U.S. provisional patent applications: 1) U.S. provisional patent application no. 62/652,941, filed on Apr. 5, 2018; 2) U.S. provisional patent application no. 62/652,949, filed on Apr. 5, 2018; and 3) U.S. provisional patent application no. 62/653,078, filed on Apr. 5, 2018. Each one of the above identified applications is hereby incorporated by reference.

TECHNICAL FIELD

Embodiments presented herein relate to a method, a transmitting node, a computer program, and a computer program product for supporting generation of comfort noise for at least two audio channels at a receiving node. Embodiments presented herein further relate to a method, a receiving node, a computer program, and a computer program product for generation of the comfort noise at the receiving node.

BACKGROUND

In communications networks, there may be a challenge to obtain good performance and capacity for a given communications protocol, its parameters and the physical environment in which the communications network is deployed.

For example, although the capacity in telecommunication networks is continuously increasing, it is still of interest to limit the required resource usage per user. In mobile telecommunication networks less required resource usage per call means that the mobile telecommunication network can service a larger number of users in parallel. Lowering the resource usage also yields lower power consumption in both devices at the user-side (such as in terminal devices) and devices at the network-side (such as in network nodes). This translates to energy and cost saving for the network operator, whilst enabling prolonged battery life and increased talk-time to be experienced in the terminal devices.

One mechanism for reducing the required resource usage for speech communication applications in mobile telecommunication networks is to exploit natural pauses in the speech. In more detail, in most conversations only one party is active at a time, and thus the speech pauses in one communication direction will typically occupy more than half of the signal. One way to utilize this property in order to decrease the required resource usage is to employ a Discontinuous Transmission (DTX) system, where the active signal encoding is discontinued during speech pauses.

During speech pauses it is common to transmit a very low bit rate encoding of the background noise to allow for a Comfort Noise Generator (CNG) system at the receiving end so as to fill the above-mentioned pauses with a background noise having similar characteristics as the original noise. The CNG makes the sound more natural compared to having silence in the speech pauses since the background noise is maintained and not switched on and off together with the speech. Complete silence in the speech pauses is commonly perceived as annoying and often leads to the misconception that the call has been disconnected.

A DTX system might further rely on a Voice Activity Detector (VAD), which indicates to the transmitting device whether to use active signal encoding or low rate background noise encoding. In this respect the transmitting device might be configured to discriminate between other source types by using a (Generic) Sound Activity Detector (GSAD or SAD), which not only discriminates speech from background noise but also might be configured to detect music or other signal types, which are deemed relevant.

Communication services may be further enhanced by supporting stereo or multichannel audio transmission. In these cases, the DTX/CNG system might also consider the spatial characteristics of the signal in order to provide a pleasant sounding comfort noise.

A common mechanism to generate comfort noise is to transmit information about the energy and spectral shape of the background noise in the speech pauses. This can be done using significantly less number of bits than the regular coding of speech segments.

At the receiving device side the comfort noise is generated by creating a pseudo random signal and then shaping the spectrum of the signal with a filler based on information received from the transmitting device. The signal generation and spectral shaping can be performed in the time or the frequency domain.

SUMMARY

An object of embodiments herein is to enable efficient generation of comfort noise for two or more channels that does not suffer from the issues noted above or at least where these issues are reduced or mitigated.

According to a first aspect there is presented a method for supporting generation of comfort noise for at least two audio channels at a receiving node. The method is performed by a transmitting node. The method comprises determining a spatial coherence between audio signals on the respective audio channels, wherein at least one spatial coherence value $C_{b,m}$ per frame m and frequency band b is determined to form a vector of spatial coherence values, wherein a vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor $\alpha$. The method is performed by a transmitting node. The method comprises determining the weight factor $\alpha$ based on a bit-budget $B_m$ available for encoding the vector of spatial coherence values in each frame m. The method is performed by a transmitting node. The method comprises signaling information about the weight factor $\alpha$ to the receiving node, for enabling the generation of the comfort noise for the at least two audio channels at the receiving node.

According to a second aspect there is presented a transmitting node for supporting generation of comfort noise for at least two audio channels at a receiving node. The transmitting node comprises processing circuitry. The processing circuitry is configured to cause the transmitting node to determine a spatial coherence between audio signals on the respective audio channels, wherein at least one spatial coherence value $C_{b,m}$ per frame m and frequency band b is determined to form a vector of spatial coherence values, wherein a vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor $\alpha$. The transmitting node comprises processing circuitry. The processing circuitry is configured to cause the transmitting node to determine the weight factor $\alpha$ based on a bit-budget $B_m$ available for encoding the vector of spatial coherence values in each frame m. The transmitting node comprises processing circuitry. The processing circuitry is configured to cause the transmitting node to signal information about the weight factor $\alpha$ to the receiving node, for enabling the generation of the comfort noise for the at least two audio channels at the receiving node.

According to a third aspect there is presented a transmitting node for supporting generation of comfort noise for at least two audio channels at a receiving node. The transmitting node comprises a determine module configured to determine a spatial coherence between audio signals on the respective audio channels, wherein at least one spatial coherence value $C_{b,m}$ per frame m and frequency band b is determined to form a vector of spatial coherence values, wherein a vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$, wherein the first coherence prediction $\hat{C}1,b,m^{(q)}$ and the second coherence prediction $\hat{C}_{2,b,m}$ are combined using a weight factor $\alpha$. The transmitting node comprises a determine module configured to determine the weight factor $\alpha$ based on a bit-budget $B_m$ available for encoding the vector of spatial coherence values in each frame m. The transmitting node comprises a signal module configured to signal information about the weight factor $\alpha$ to the receiving node, for enabling the generation of the comfort noise for the at least two audio channels at the receiving node.

According to a fourth aspect there is presented a computer program for supporting generation of comfort noise for at least two audio channels at a receiving node, the computer program comprising computer program code which, when run on processing circuitry of a transmitting node, causes the transmitting node to perform a method according to the first aspect.

According to a fifth aspect there is presented a method for generation of comfort noise for at least two audio channels at a receiving node. The method is performed by the receiving node. The method comprises receiving information about a weight factor $\alpha$ from the transmitting node. The method comprises determining a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor $\alpha$. The method comprises determining the weight factor $\alpha$ based on a bit-budget $B_m$ available for encoding a vector of spatial coherence values in each frame and the received information. The method comprises generating comfort noise for the at least two audio channels based on the weighted combination of the first coherence prediction $\hat{C}_{1,b,m}^{(q)}$ and the second coherence prediction $\hat{C}_{2,b,m}$.

According to a sixth aspect there is presented a receiving node for generation of comfort noise for at least two audio channels at the receiving node. The receiving node comprises processing circuitry. The processing circuitry is configured to cause the receiving node to receive information about a weight factor $\alpha$ from the transmitting node. The processing circuitry is configured to cause the receiving node to determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor $\alpha$. The processing circuitry is configured to cause the receiving node to determine the weight factor $\alpha$ based on a bit-budget $B_m$ available for encoding a vector of spatial coherence values in each frame and the received information. The processing circuitry is configured to cause the receiving node to generate comfort noise for the at least two audio channels based on the weighted combination of the first coherence prediction $\hat{C}_{1,b,m}^{(q)}$ and the second coherence prediction $\hat{C}_{2,b,m}$.

According to a seventh aspect there is presented a receiving node for generation of comfort noise for at least two audio channels at the receiving node. The receiving node comprises a receive module configured to receive information about a weight factor $\alpha$ from the transmitting node. The receiving node comprises a determine module configured to determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor $\alpha$. The receiving node comprises a determine module configured to determine the weight factor $\alpha$ based on a bit-budget $B_m$ available for encoding a vector of spatial coherence values in each frame and the received information. The receiving node comprises a generate module configured to generate comfort noise for the at least two audio channels based on the weighted combination of the first coherence prediction $\hat{C}_{1,b,m}^{(q)}$ and the second coherence prediction $\hat{C}_{2,b,m}$.

According to an eight aspect there is presented a computer program for generation of comfort noise for at least two audio channels at a receiving node, the computer program comprising computer program code which, when run on processing circuitry of a receiving node, causes the receiving node to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

According to a tenth aspect there is presented a radio transceiver device. The radio transceiver device comprises a transmitting node according to the second or third aspect, and/or a receiving node according to the sixth or seventh aspect.

Advantageously these methods, this transmitting node, this receiving node, these computer programs and this radio transceiver device enable comfort noise to be generated at the receiving node for two or more channels without suffering from the issues noted above.

Advantageously these methods, this transmitting node, this receiving node, these computer programs and this radio transceiver device enable the amount of information that needs to be encoded in a stereo DTX system to be reduced, whilst keeping the ability to recreate a realistic stereo image at the receiving node.

Other objectives, features and advantages of the enclosed embodiments will be apparent from the following detailed disclosure, from the claims as well as from the drawings.

BRIEF DESCRIPTION OF THE DRAWINGS

The inventive concept is now described, by way of example, with reference to the accompanying drawings, in which.

DETAILED DESCRIPTION

Figure 1:
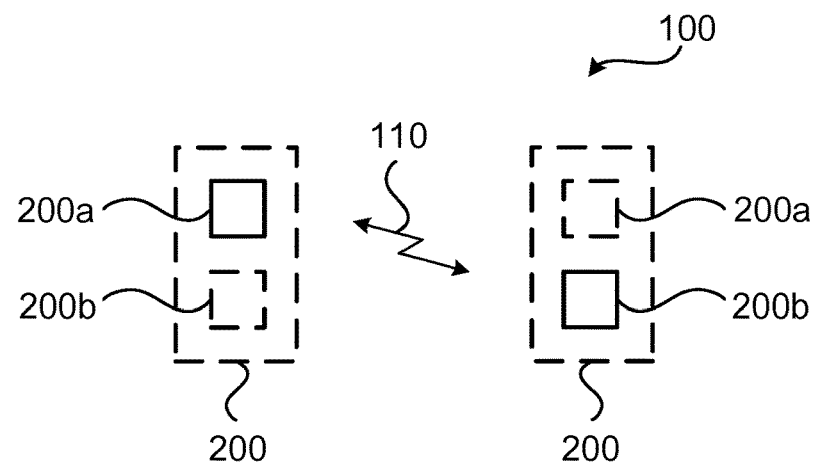
FIG. 1 is a schematic diagram illustrating a communication network according to embodiments.

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

In the following description, terms channel coherence and spatial coherence are interchangeably used.

When two mono encoders each having its own DTX system working separately on the signals in each of the two stereo channels are used, different energy and spectral shape in the two different signals can be transmitted.

In most realistic cases the difference in energy and spectral shape between the signal in the left channel and the signal in the right channel will not be large but there could still be a big difference in how wide the stereo image of the signal is perceived.

If the random sequences used to generate the comfort noise is synchronized between the signal in the left channel and the signal in the right channel the result will be a stereo signal sounds with a very narrow stereo image and which gives the sensation of the sound originating from within the head of the user. If instead the signal in the left channel and the signal in the right channel would not be synchronized it would give the opposite effect, i.e. a signal with a very wide stereo image.

In most cases the original background noise will have a stereo image that is somewhere in-between these two extremes which mean that there would be an annoying difference in the stereo image when the transmitting device switches between active speech encoding and non-active noise encoding.

The perceived stereo image width of the original background noise might also change during a call, e.g. because the user of the transmitting device is moving around and/or because of things occurring in the background. A system with two mono encoders each having its own DTX system has no mechanism to follow these changes.

One additional issue with using a dual mono DTX system is that the VAD decision will not be synchronized between the two channels, which might lead to audible artifacts when e.g. the signal in the left channel is encoded with active encoding and the signal in the right channel is encoded with the low bit rate comfort noise encoding. It might also lead to that the random sequence will be synchronized in some time instances and unsynchronized in others, resulting in a stereo image that toggles between being extremely wide and extremely narrow over time.

Hence, there is still a need for an improved generation of comfort noise for two or more channels.

FIG. 1 is a schematic diagram illustrating a communication network 100 where embodiments presented herein can be applied. The communication network 100 comprises a transmitting node 200a communicating with a receiving node 200b over a communications link 110.

The transmitting node 200a might communicate with the receiving node 200b over a direct communication link 110 or over an indirect communication link 110 via one or more other devices, nodes, or entities, such as network nodes, etc. in the communication network 100.

In some aspects the transmitting node 200a is part of a radio transceiver device 200 and the receiving node 200b is part of another radio transceiver device 200. Additionally, in some aspects the radio transceiver device 200 comprises both the transmitting node 200a and the receiving node 200b. There could be different examples of radio transceiver devices. Examples include, but are not limited to, portable wireless devices, mobile stations, mobile phones, handsets, wireless local loop phones, user equipment (UE), smartphones, laptop computers, and tablet computers.

Figure 2:
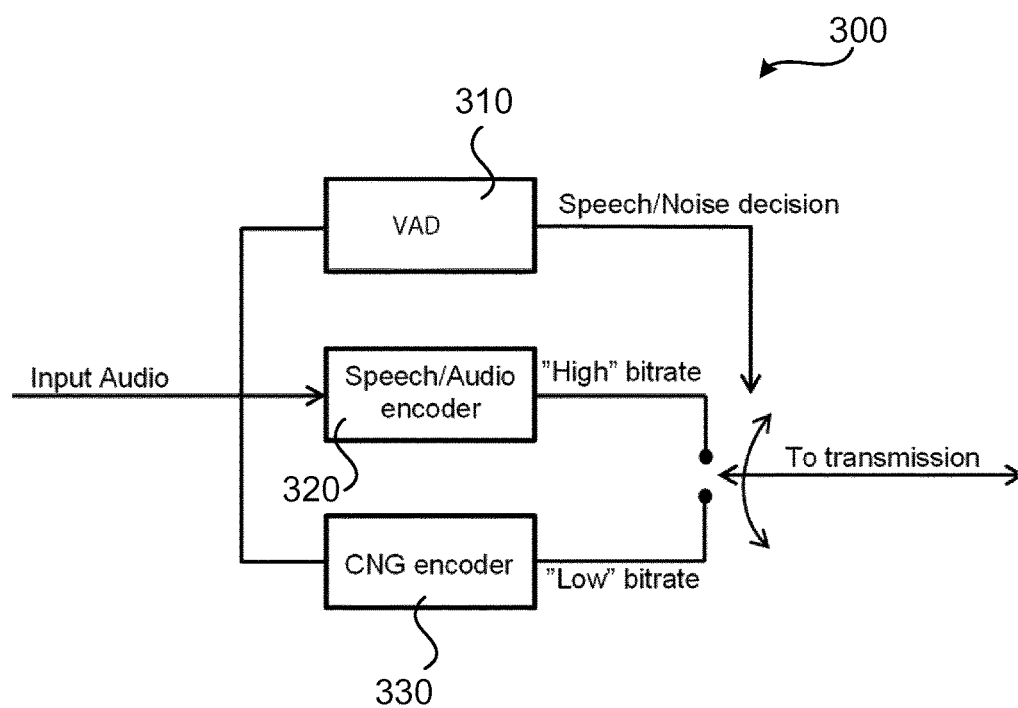
FIG. 2 schematically illustrates a DTX system according to an embodiment.

As disclosed above, a DTX system can be used in order to transmit encoded speech/audio only when needed. FIG. 2 is a schematic block diagram of a DTX system 300 for one or more audio channels. The DTX system 300 could be part of, collocated with, or implemented in, the transmitting node 200a.

Input audio is provided to a VAD 310, a speech/audio encoder 320 and a CNG encoder 330. The speech/audio encoder is activated when the VAD indicates that the signal contains speech or audio and the CNG encoder is activated when the VAD indicates that the signal contains background noise. The VAD correspondingly selectively controls whether to transmit the output from the speech/audio encoder or the CNG encoder. Issues with existing mechanisms for generation of comfort noise for two or more channels have been disclosed above.

The embodiments disclosed herein therefore relate to mechanisms for supporting generation of comfort noise for at least two audio channels at a receiving node 200b and for generation of comfort noise for at least two audio channels at a receiving node 200b. In order to obtain such mechanisms there is provided a transmitting node 200a, a method performed by the transmitting node 200a, a computer program product comprising code, for example in the form of a computer program, that when run on processing circuitry of the transmitting node 200a, causes the transmitting node 200a to perform the method. In order to obtain such mechanisms there is further provided a receiving node 200b, a method performed by the receiving node 200b, and a computer program product comprising code, for example in the form of a computer program, that when run on processing circuitry of the receiving node 200b, causes the receiving node 200b to perform the method.

Figure 3:
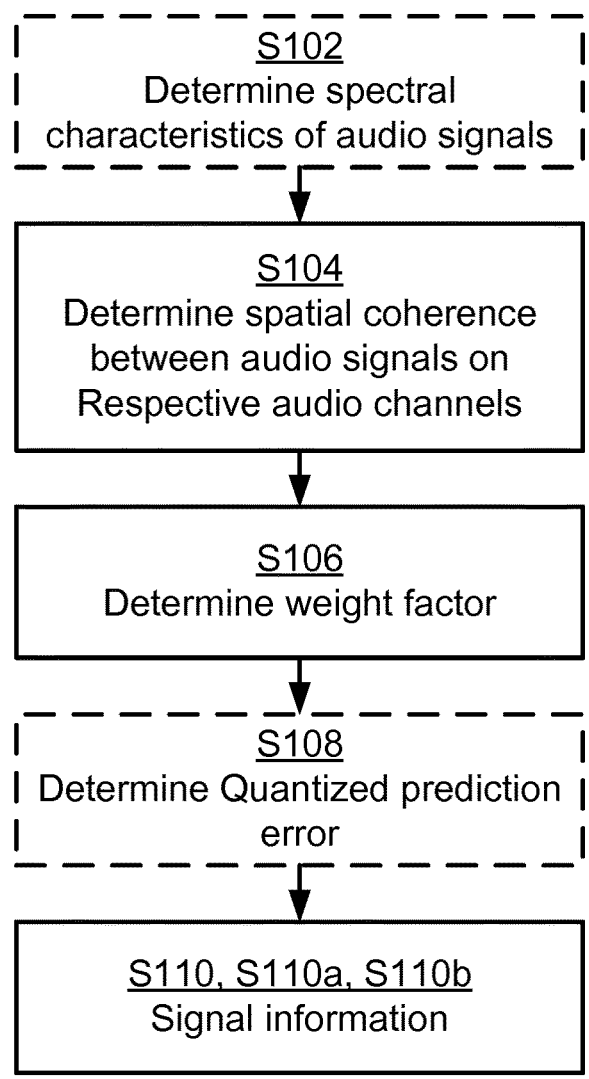
FIG. 3 is a flowchart of a method according to an embodiment.

Reference is now made to FIG. 3 illustrating a method for supporting generation of comfort noise for at least two audio channels at a receiving node 200b as performed by the transmitting node 200a according to embodiments.

S104: The transmitting node 200a determines a spatial coherence between audio signals on the respective audio channels. At least one spatial coherence value $C_{b,m}$, per frame m and frequency band b is determined to form a vector of spatial coherence values $C_m$.

A vector $\hat{C}_{pred,m}^{(q)}$ of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$. The first coherence prediction $\hat{C}_{1,b,m}^{(q)}$ and the second coherence prediction $\hat{C}_{2,b,m}$ are combined using a weight factor $\alpha$.

S106: The transmitting node 200a determines the weight factor $\alpha$ based on a bit-budget $B_m$ available for encoding the vector of spatial coherence values in each frame m.

S110: The transmitting node 200a signals information such that the weight factor $\alpha$ can be reconstructed in the receiving node 200b, for enabling the generation of the comfort noise for the at least two audio channels at the receiving node 200b.

Embodiments relating to further details of supporting generation of comfort noise for at least two audio channels at a receiving node 200b as performed by the transmitting node 200a will now be disclosed.

In some aspects each frequency band b is represented by one single reconstructed spatial coherence value $\hat{C}_{b,m}$ per frame m and frequency band b. In some aspects each frequency band b is represented by more than one reconstructed spatial coherence value $\hat{C}_{b,m}$ per frame m and frequency band b to more accurately describe the shape of the spatial coherence within each frequency band b. One example would be to approximate the coherence within a frequency band b with a function, $C(k)=a_b*k+K_b$, for limit $(b) \leq k < \text{limit}(b+1)$, where $a_b$ and $K_b$ are the two values to be encoded for each frequency band b, where k is the frequency bin index, and where limit(b) denotes the lowest frequency bin of frequency band b. In some aspects limit(b) is provided as a function or lookup table.

The herein disclosed embodiments are applicable to a stereo encoder and decoder architecture as well as for a multi-channel encoder and decoder where the channel coherence is considered in channel pairs.

In some aspects the stereo encoder receives a channel pair [l(m, n) r(m, n)] as input, where l(m, n) and r(m, n) denote the input signals for the left and right channel, respectively, for sample index n of frame m. The signal is processed in frames of length N samples at a sampling frequency $f_s$, where the length of the frame might include an overlap (such as a look-ahead and/or memory of past samples).

As in FIG. 2 a stereo CNG encoder is activated when the stereo encoder VAD indicates that the signal contains background noise. The signal is transformed to frequency domain by means of e.g. a discrete Fourier transform (DFT) or any other suitable filter-bank or transform such as quadrature mirror filter (QMF), Hybrid QMF or modified discrete cosine transform (MDCT). In case a DFT or MDCT transform is used, the input signal is typically windowed before the transform, resulting in the channel pair [$l_{win}$(m, n) $r_{win}$(m, n)] determined according to:

$$[l_{win}(m,n) r_{win}(m,n)] = [l(m,n)\text{win}(n) r(m,n)\text{win}(n)],$$
$$n = 0, 1, 2, \ldots, N-1.$$

Hence, in some aspects the audio signals l(m, n), r(m, n), for frame index m and sample index n, of the at least two audio channels are windowed to form respective windowed signals $l_{win}$(m, n), $r_{win}$(m, n) before the spectral characteristics are determined. The choice of window might generally depend on various parameters, such as time and frequency resolution characteristics, algorithmic delay (overlap length), reconstruction properties, etc. The thus windowed channel pair [$l_{win}$(m, n) $r_{win}$(m, n)] is then transformed according to:

$$[L(m, k) R(m, k)] = [DFT(l_{win}(m, n)) DFT(r_{win}(m, n))],$$

$$\begin{cases} n = 0, 1, 2, \ldots, N-1 \\ k = 0, 1, 2, \ldots, N-1 \\ m = 0, 1, 2, \ldots \end{cases}.$$

A general definition of the channel coherence $C_{gen}$(f) for frequency f is given by:

$$C_{gen}(f) = \frac{|S_{xy}(f)|^2}{S_{xx}(f)S_{yy}(f)}$$

where $S_{xx}$(f) and $S_{yy}$(f) represent the respective power spectrum of the two channels x and y, and $S_{xy}$(f) is the cross power spectrum of the two channels x and y. In a DFT based solution, the spectra may be represented by the DFT spectra. In some aspects the spatial coherence C(m, k) for frame index m and sample index k is determined as:

$$C(m, k) = \frac{|L(m, k)^* \cdot R(m, k)|^2}{|L(m, k)|^2 \cdot |R(m, k)|^2}$$

where L(m, k) is the spectrum of the windowed audio signal $l_{win}$(m, n), where R(m, k) is the spectrum of the windowed audio signal $r_{win}$(m, n), and where * denotes the complex conjugate.

The above expression for the coherence is commonly computed with a high frequency resolution. One reason for this is that for some parts of the coherence calculation, the left and right power spectra $S_{xx}$(f) and $S_{yy}$(f), are needed with high resolution for other purposes in a typical audio encoder. A typical value with a sampling frequency $f_s$=48 kHz and frame length of 20 ms would be 960 frequency bins for the channel coherence.

Figure 4:
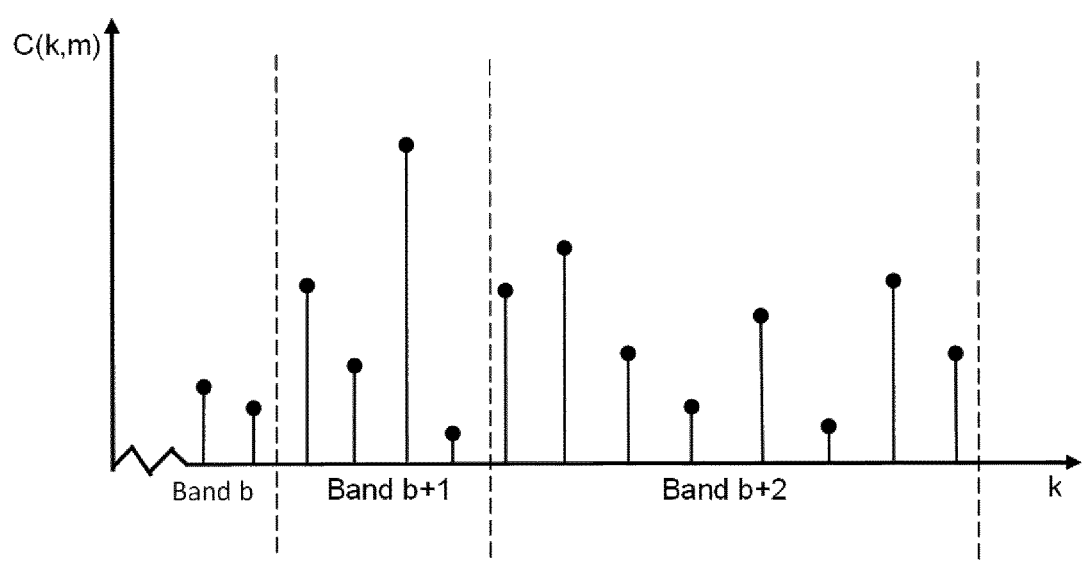
FIG. 4 schematically illustrates a spectrum of channel coherence values according to an embodiment.

For an application of DTX where it is crucial to keep the bit rate for encoding inactive (i.e. non-speech) segments low it is not feasible to transmit the channel coherence with high frequency resolution. To reduce the number of bits to encode the channel coherence values, the spectrum can be divided into frequency bands as shown in FIG. 4. The number of frequency bands is typically in the order of 2-50 for the full audible bandwidth of 20-20000 Hz.

All frequency bands might have equal frequency-wise width, but more common in audio coding applications is to match the width of each frequency band to the human perception of audio, thus resulting in comparatively narrow frequency bands for the low frequencies and increasing widths of the frequency bands for higher frequencies. In some aspects the spatial coherence is divided into frequency bands of non-equal lengths. For example, the frequency bands can be created using the ERB-rate scale, where ERB is short for equivalent rectangular frequency bandwidth.

The coherence representative values given per frequency band form the vector of spatial coherence values $C_m = [C_{1,m} \, C_{2,m} \, \ldots \, C_{b,m} \, \ldots \, C_{N_{bnd},m}]$, where $N_{bnd}$ is the number of frequency bands, b is the frequency band index and m is the frame index. The vector of spatial coherence values $C_m$ is then encoded to be stored or transmitted to a decoder of the receiving node 200b. Particularly, according to an embodiment the transmitting node 200a is configured to perform (optional) steps S102, S110a.

S102: The transmitting node 200a determines spectral characteristics of the audio signals on the input audio channels.

S110a: The transmitting node 200a signals information about the spectral characteristics to the receiving node 200b. This information can e.g. be the filler coefficients obtained through Linear Prediction Analysis or the magnitude spectrum obtained through a Discrete Fourier Transform.

Step S110a could be performed as part of step S110.

If the number of bits available to encode the vector of spatial coherence values $C_m$ for a given frame m is varying between frames and there is an intra-frame coding scheme designed to efficiently encode $C_m$ where this coding scheme has the property that it is possible to truncate the number of encoded bits if the bit budget is not met, then the herein disclosed embodiments can be used to further enhance the intra-frame coding scheme. Therefore, according to an embodiment the first coherence prediction $\hat{C}_{1,b,m}^{(q)}$ is defined by an intra-frame prediction $\hat{C}_{intra,b,m}^{(q)}$ of the vector of spatial coherence values. Further, according to an embodiment the second prediction $\hat{C}_{2,b,m}$ is defined by an inter-frame coherence prediction $\hat{C}_{inter,b,m}$ of the vector of spatial coherence values. The at least one reconstructed spatial coherence value $\hat{C}_b$ is then formed based on a predicted spatial coherence value $\hat{C}_{pred,b,m}^{(q)}$.

In cases where the background noise is stable or changing slowly, the frame-to-frame variation in the coherence band values $C_{b,m}$ will be small. Hence, an inter-frame prediction using the values from previous frame will often be a good approximation which yields a small prediction residual and a small residual coding bit rate. Particularly, according to an embodiment the predicted spatial coherence value $\hat{C}_{pred,b,m}^{(q)}$ is determined according to:

$$\hat{C}_{pred,b,m}^{(q)} = \alpha \hat{C}_{intra,b,m}^{(q)} + (1-\alpha)\hat{C}_{inter,b,m},$$

where the resulting prediction $\hat{C}_{pred,b,m}^{(q)}$ thus is a sum of the intra-frame prediction $\hat{C}_{intra,b,m}^{(q)}$ and the inter-frame prediction $\hat{C}_{intra,b,m}^{(q)}$. A balance can thereby be found between taking advantage of the inter-frame correlation of the spatial coherence whilst minimizing the risk of error propagation in case of frame loss.

In general terms, the weight factor $\alpha$ can take a value in the range from 0 to 1, i.e. from only using information from the current frame ($\alpha=1$) to only using information from the previous frame ($\alpha=0$) and anything in-between ($0<\alpha<1$). It is in some aspects desirable to use an as high weight factor $\alpha$ as possible since a lower weight factor $\alpha$ might make the encoding more sensitive to lost frames. But selection of the weight factor $\alpha$ has to be balanced with the bit budget $B_m$ per frame m since a lower value of the weight factor $\alpha$ commonly yields less encoded bits.

The value of the weight factor $\alpha$ used in the encoding has to, at least implicitly, be known in the decoder at the receiving node 200b. That is, information about the weight factor $\alpha$ has to be encoded and transmitted (as in step S110) to the decoder at the receiving node 200b. Further aspects of how to provide the information about the weight factor $\alpha$ will be disclosed below.

It is further assumed that the bit budget $B_m$ for frame m for encoding the spatial coherence is known in the decoder at the receiving node 200b without explicit signaling from the transmitting node 200a. In this respect the value of the bit budget $B_m$ is thus explicitly signalled to the receiving node 200b. It comes as a side effect, since the decoder at the receiving node 200b knows how to interpret the bitstream it also knows how many bits have been decoded. The remaining bits are simply found at the decoder at the receiving node 200b by subtracting the decoded number of bits from the total bit budget (which is also known).

In some aspects, based on the bit-budget $B_m$ a set of candidate weight factors is selected and a trial encoding (without performing the rate-truncation strategy as disclosed below) with the combined prediction and residual encoding scheme is performed for all these candidate weight factors in order to find the total number of encoded bits, given the candidate weight factor used. Particularly, according to an embodiment the weight factor $\alpha$ is determined by selecting a set of at least two candidate weight factors and performing trial encoding of the vector of spatial coherence values for each candidate weight factor.

In some aspects, which candidate weight factors to use during the trial encoding is based on the bit-budget $B_m$. In this respect, the candidate weight factors might be determined by means of performing a table lookup with the bit-budget $B_m$ as input or by inputting the bit-budget $B_m$ to a function. The table lookup might be performed on table values obtained through training on a set of background noise.

The trial encoding for each candidate weight factor yields a respective total number of encoded bits for the vector of spatial coherence values. The weight factor $\alpha$ might then be selected depending on whether the total number of encoded bits for the candidate weight factors fits within the bit-budget $B_m$ or not. Particularly, according to an embodiment the weight factor $\alpha$ is selected as the largest candidate weight factor for which the total number of encoded bits fits within the bit-budget $B_m$. According to an embodiment the weight factor $\alpha$ is selected as the candidate weight factor yielding fewest total number of encoded bits when the total number of encoded bits does not fit within the bit-budget $B_m$ for any of the candidate weight factors.

That is, if all candidate weight factors lead to a total number of encoded bits being within the bit-budget $B_m$, the highest candidate weight factor is selected as the weight factor $\alpha$. Likewise, if only the lowest or none of the candidate weight factors lead to a total number of bits within the bit-budget $B_m$, the candidate weight factor that leads to the lowest number of bits is selected as the weight factor $\alpha$. Which of the candidate weight factor is selected is then signaled to the decoder at the receiving node 200b.

Further aspects of the intra-frame prediction and the inter-frame prediction will now be disclosed.

For each frame m, the encoder at the transmitting node 200a receives a vector $C_m$ to encode, a memory of the last reconstructed vector $\hat{C}_{m-1}$, and a bit budget $B_m$. A variable $B_{curr,m}$, to keep track of the bits spent is initialized to zero, $B_{curr,m}=0$. Bits spent in preceding encoding steps may be included in $B_m$ and $B_{curr,m}$. In that case the bit budget in the step outlined can be written as: $B_m-B_{curr,m}$.

In some aspects the transmitting node 200a selects a predictor set $P^{(q)}$ which gives the smallest prediction error. That is, the predictor set $P^{(q*)}$ is selected out of the available predictor sets $P^{(q)}$, $q=1, 2, \ldots, N_q$ such that:

$$q^* = \underset{q'}{\operatorname{argmin}} \sum_{b=2}^{N_{bnd}} \left| C_{intra,b,m}^{(q')} - C_{b,m} \right|^2, q' = 1, 2, \ldots, N_q.$$

Here, b=1 is omitted since the prediction is zero and contribution to the error will be the same for all predictor sets. The selected predictor set index is stored and $B_{curr,m}$ is increased with the required number of bits, e.g., $B_{curr,m}:=B_{curr,m}+z$, where z denotes the number of bits required to encode the selected predictor set $P^{(\xi*)}$.

Since the first coefficient cannot rely on prediction from previous coefficients, it might, optionally, be desirable to encode this coefficient separately. For instance, the first coefficient might be encoded using a scalar quantizer to produce the reconstructed value $\hat{C}_{SQ,1,m}$. In that case:

$$\hat{C}_{intra,1,m}^{(q)} = \hat{C}_{SQ,1,m}$$

instead of:

$$\hat{C}_{intra,1,m}^{(q)} = 0$$

Alternatively, $\hat{C}_{intra,1,m}^{(q)}$ is given by an average value $\overline{C}$:

$$\hat{C}_{intra,1,m}^{(q)} = \overline{C}.$$

If the first coefficient indeed is encoded, the bits for the encoding are then added to the spent number of bits, e.g. $B_{curr,m}:=B_{curr,m}+z_1$, where $z_1$ denotes the number of bits used to encode the first coefficient.

An illustrative example where the trial encoding is performed for two candidate weight factors $\alpha_{low}$ and $\alpha_{high}$, resulting in the number of bits $B_{currlow,m}$ and $B_{currhigh,m}$, respectively, needed for the encoding of the vector of spatial coherence values will now be disclosed.

Using $B_{curr,m}$ as the input, two candidate weight factors $\alpha_{low}$ and $\alpha_{high}$ are obtained, either by means of performing a table lookup with the bit-budget $B_m$ as input or by inputting the bit-budget $B_m$ to a function. Trial encoding is performed without the rate-truncation strategy described below for each candidate weight factor $\alpha_{low}$ and $\alpha_{high}$, yielding two values $B_{currlow,m}$ and $B_{currhigh,m}$ of the number of bits needed for the encoding. Based on this, one of the two candidate weight factors $\alpha_{low}$ and $\alpha_{high}$ is selected according for the encoding as follows:

$$\alpha = \begin{cases} \alpha_{high}, & B_{currhigh,m} \leq B_m \\ \alpha_{low}, & B_{currlow,m} \leq B_m < B_{currhigh,m} \\ \operatorname{argmin}(B_{curr,m}), & \min(B_{currlow,m}, B_{currhigh,m}) > B_m \end{cases}.$$

The selected weight factor $\alpha$ is encoded using one bit, e.g. "0" for $\alpha_{low}$ and "1" for $\alpha_{high}$. The third alternative in the expression above for the weight factor $\alpha$ should be interpreted as follows: If both candidate weight factors $\alpha_{low}$ and $\alpha_{high}$ yield a resulting number of encoded bits that exceeds the bit budget $B_m$, then the candidate weight factor yielding the lowest number of encoded bits is selected.

For each of the frequency bands b=1, 2, ... $N_{bnd}$, the following steps are then performed.

The transmitting node 200a obtains an intra-frame prediction value $\hat{C}_{intra,b,m}^{(q)}$. For the first frequency band, b=1, there are no preceding coherence values encoded. In this case, the intra-frame prediction may thus be encoded as disclosed above. For the remaining frequency bands b=2, 3, ..., $N_{bnd}$, the intra-frame prediction $\hat{C}_{intra,b,m}^{(q)}$ is based on the previously encoded coherence values. That is:

$$\hat{C}_{intra,b,m}^{(q)} \Sigma_{i=1}^{b-1} p_{b,i}^{(q)} \hat{C}_{i,m}.$$

The transmitting node 200a obtains an inter-frame prediction value $\hat{C}_{inter,b,m}$ based on previously reconstructed elements of the vector of spatial coherence values from one or more preceding frames. An example of an inter-frame prediction value is to, for frequency band b use the last reconstructed value for frequency band b. That is, $\hat{C}_{inter,b,m} = \hat{C}_{b,m-1}$.

The transmitting node 200a forms a weighted prediction $\hat{C}_{pred,b,m}^{(q)}$, based on the intra-frame prediction $\hat{C}_{intra,b,m}^{(q)}$ and the inter-frame prediction $\hat{C}_{inter,b,m}$, according to the above expression for the predicted spatial coherence value $\hat{C}_{pred,b,m}^{(q)}$. That is $\hat{C}_{pred,b,m}^{(q)} = \alpha \hat{C}_{intra,b,m}^{(q)} + (1-\alpha) \hat{C}_{inter,b,m}$.

The transmitting node 20000a then determines a prediction residual $r_{b,m} = C_{b,m} - \hat{C}_{pred,b,m}^{(q)}$. The prediction residual may be quantized using a scalar quantizer and then encoded with a variable length code scheme such that fewer bits are consumed for smaller residuals. Some examples for encoding the residual are by means of Huffman coding, Golomb-Rice coding or a unary code (where the latter is the same as the Golomb-Rice coding with divisor 1).

For the residual encoding, the remaining bit budget $B_m - B_{curr,m}$ needs to be considered. If there are not sufficiently many remaining bits to encode the residual $r_{b,m}$, a bit rate truncation strategy can be applied. One possible strategy is to encode the largest possible residual value, assuming that the smaller residual values cost fewer bits. Another strategy is to set the residual value to zero, which could be the most common prediction residual value and would be encoded with one bit. Hence, according to an embodiment the transmitting node 200a is configured to perform (optional) steps S108, S110b.

S108: The transmitting node 200a determines a quantized prediction error per frame m and frequency band b by subtracting the at least one predicted spatial coherence value $\hat{C}_{pred,b,m}^{(q)}$ from the vector of spatial coherence values.

S110b: The transmitting node 200a signals information about the quantized prediction error to the receiving node 200b.

Step S110b could be performed as part of step S110.

If there are no bits remaining within the bit budget, i.e. $B_m = B_{curr,m}$, then the residual might be set to zero without sending the index to the bitstream. The decoder at the receiving node 200b can also detect that the bit budget has run out and use the zero residual $r_{b,m}=0$ without explicit signaling.

The receiving node 200b could then derive a reconstructed spatial coherence value $\hat{C}_{b,m}$ using the reconstructed prediction residual $\hat{r}_{b,m}$ from the scalar quantizer and the predicted spatial coherence value $C_{pred,b,m}^{(q)}$, $$\hat{C}_{b,m} = \hat{C}_{pred,b,m}^{(q)} + \hat{r}_{b,m}.$$

Figure 5:
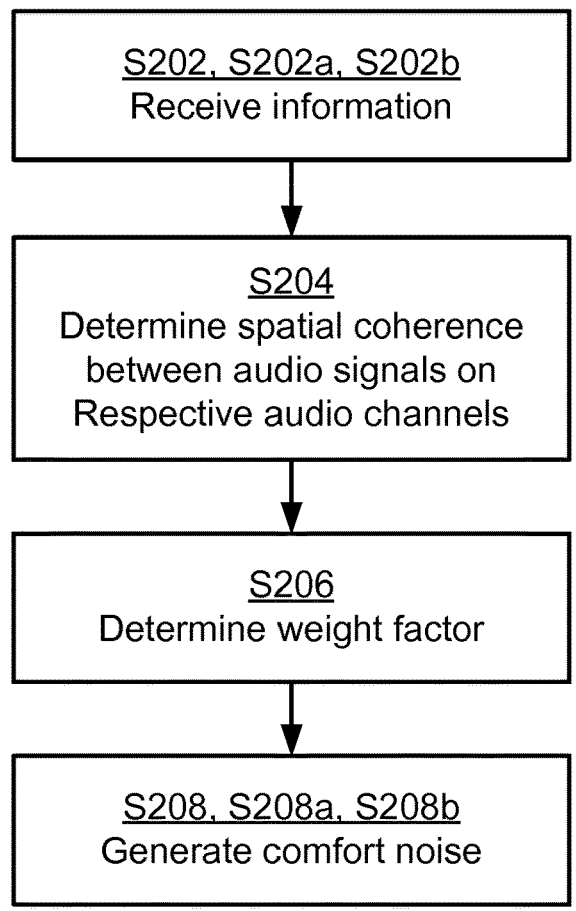
FIG. 5 is a flowchart of a method according to an embodiment.

It should be noted that the reconstructed spatial coherence value $\hat{C}_{b,m}$ is similarly derived at the encoder where previously encoded coherence values $\hat{C}_{i,m}$ are used in the intra-frame prediction for frame m, and previously reconstructed elements from one or more preceding frames are used in the inter-frame prediction, e.g. the last reconstructed value $\hat{C}_{b,m-1}$ for frequency band b. Reference is now made to FIG. 5 illustrating a method for generation of comfort noise for at least two audio channels at a receiving node 200b as performed by the receiving node 200b according to embodiments.

In general terms, the receiving node 200b is configured to reproduce the first and second prediction of the coherence value based on information obtained from the transmitting node 200a. In some aspects the receiving node 200b perform operations corresponding to those of the transmitting node 200a, starting with reception of necessary information.

S202: The receiving node 200b receives information about the weight factor α from the transmitting node 200a.

This enables the receiving node 200b to reproduce the first and second prediction identical to the ones in the transmitting node 200a. The receiving node 200b, then performs essentially the same steps as the transmitting node 200a.

S204: The receiving node 200b determines a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{1,b,m}$ are combined using the weight factor α.

S206: The receiving node 200b determines the weight factor α based on a bit-budget $B_m$ available for encoding the vector of spatial coherence values in each frame and the received information.

S208: The receiving node 200b generates comfort noise for the at least two audio channels based on the weighted combination of the first coherence prediction $\hat{C}_{1,b,m}^{(q)}$ and the second coherence prediction $\hat{C}_{2,b,m}$.

Embodiments relating to further details of generation of comfort noise for at least two audio channels at a receiving node 200b as performed by the receiving node 200b will now be disclosed.

In general terms, the embodiments as disclosed above with reference to the transmitting node 200a are also applicable to the receiving node 200b as modified where needed.

As disclosed above, according to an embodiment the transmitting node 200a signals information about the spectral characteristics to the receiving node 200b. Therefore, according to an embodiment the receiving node 200b is configured to perform (optional) steps S202a and S208a:

S202a: The receiving node 200b receives information about spectral characteristics of the audio signals.

S208a: The receiving node 200b generates the comfort noise also based on the information about the spectral characteristics.

In some aspects step S202a is performed as part of step S202 and step S208a is performed as part of step S202.

As disclosed above, according to an embodiment the transmitting node 200a signals information about the quantized prediction error to the receiving node 200b. Therefore, according to an embodiment the receiving node 200b is configured to perform (optional) steps S202a and S208a:

S202b: The receiving node 200b receives information about a quantized prediction error per frame m and frequency band b.

S208b: The receiving node 200b adds the quantized prediction error to the vector of spatial coherence values as part of generating the comfort noise.

In some aspects step S202b is performed as part of step S202 and step S208b is performed as part of step S202.

In some aspects the weight factor α is determined by selecting a set of at least two candidate weight factors and using the received information about the weight factor α to select which candidate weight factors to use during trial encoding.

Figure 6:
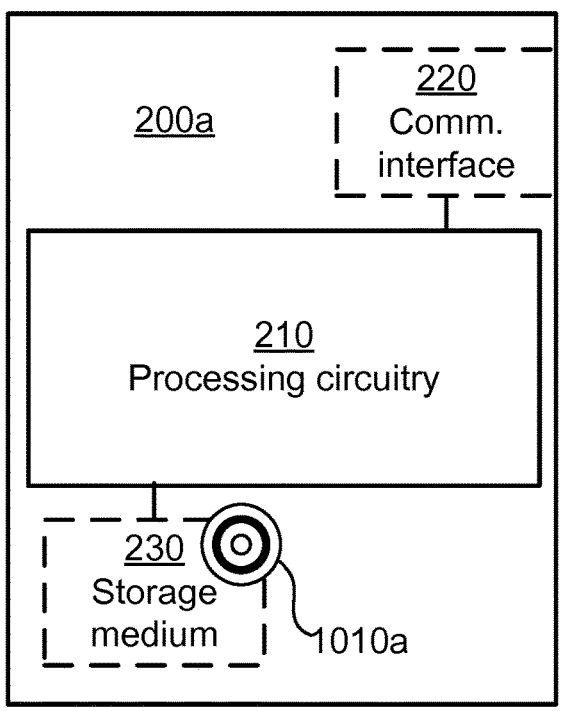
FIG. 6 is a schematic diagram showing functional units of a transmitting node according to an embodiment.

FIG. 6 schematically illustrates, in terms of a number of functional units, the components of a transmitting node 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the transmitting node 200a to perform a set of operations, or steps, as disclosed above. For example, the storage medium 230 may store the set of operations, and the processing circuitry 210 may be configured to retrieve the set of operations from the storage medium 230 to cause the transmitting node 200a to perform the set of operations. The set of operations may be provided as a set of executable instructions. Thus the processing circuitry 210 is thereby arranged to execute methods as herein disclosed.

In an embodiment the transmitting node 200a for supporting generation of comfort noise for at least two audio channels at a receiving node comprises a processing circuitry 210. The processing circuitry is configured to cause the transmitting node to determine a spatial coherence between audio signals on the respective audio channels, wherein at least one spatial coherence value $C_{b,m}$ per frame m and frequency band b is determined to form a vector of spatial coherence values. A vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$. The first coherence prediction $\hat{C}_{1,b,m}^{(q)}$ and the second coherence prediction $\hat{C}_{2,b,m}$ are combined using a weight factor α. The weight factor α is determined based on a bit-budget $B_m$ available for encoding the vector of spatial coherence values in each frame m. The transmitting node is further caused to signal information about the weight factor α to the receiving node, for enabling the generation of the comfort noise for the at least two audio channels at the receiving node.

The storage medium 230 may also comprise persistent storage, which, for example, can be any single one or combination of magnetic memory, optical memory, solid state memory or even remotely mounted memory.

The transmitting node 200a may further comprise a communications interface 220 for communications with a receiving node 200b. As such the communications interface 220 may comprise one or more transmitters and receivers, comprising analogue and digital components.

The processing circuitry 210 controls the general operation of the transmitting node 200a e.g. by sending data and control signals to the communications interface 220 and the storage medium 230, by receiving data and reports from the communications interface 220, and by retrieving data and instructions from the storage medium 230. Other components, as well as the related functionality, of the transmitting node 200a are omitted in order not to obscure the concepts presented herein.

Figure 7:
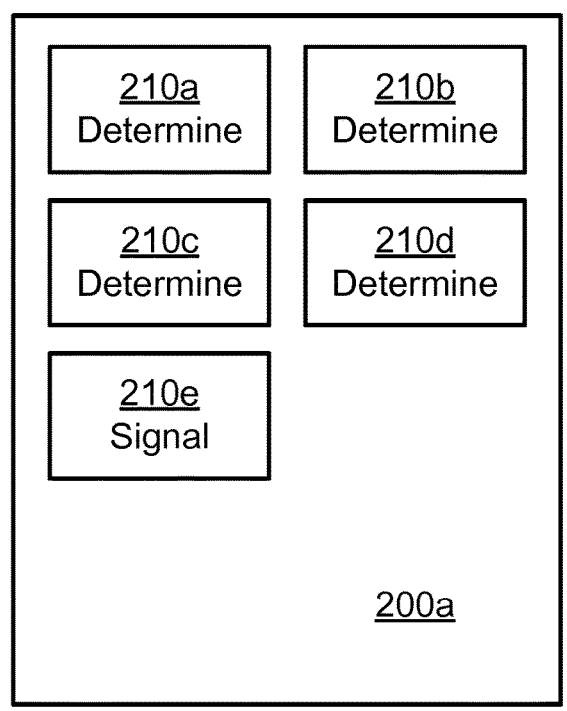
FIG. 7 is a schematic diagram showing functional modules of a transmitting node according to an embodiment.

FIG. 7 schematically illustrates, in terms of a number of functional modules, the components of a transmitting node 200a according to an embodiment. The transmitting node 200a of FIG. 7 comprises a number of functional modules; a determine module 210a configured to perform step S102, a determine module 210b configured to perform step S104, a determine module 210c configured to perform step S106, a determine module 210d configured to perform step S108, and a signal module 210e configured to perform step S110. The signal module 210e might further be configured to perform any of steps S110a and S110b. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the transmitting node 200a as disclosed herein.

Figure 8:
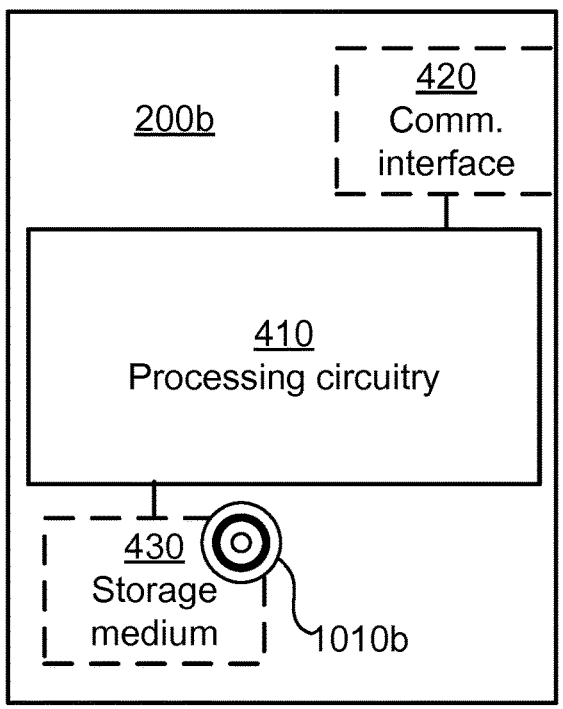
FIG. 8 is a schematic diagram showing functional units of a receiving node according to an embodiment.

FIG. 8 schematically illustrates, in terms of a number of functional units, the components of a receiving node 200b according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 430. The processing circuitry 410 may further be provided as at least one application specific integrated circuit (ASIC), or field programmable gate array (FPGA).

Particularly, the processing circuitry 410 is configured to cause the receiving node 200b to perform a set of operations, or steps, as disclosed above. For example, the storage medium 430 may store the set of operations, and the processing circuitry 410 may be configured to retrieve the set of operations from the storage medium 430 to cause the receiving node 200b to perform the set of operations. The set of operations may be provided as a set of executable instructions. Thus the processing circuitry 410 is thereby arranged to execute methods as herein disclosed.

In an embodiment the receiving node 200b for generation of comfort noise for at least two audio channels at the receiving node comprises processing circuitry 410. The processing circuitry is configured to cause the receiving node to receive information about a weight factor α from the transmitting node, and to determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values. The vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor α. The weight factor α is determined based on a bit-budget $B_m$ available for encoding a vector of spatial coherence values in each frame and the received information. The receiving node is further caused to generate comfort noise for the at least two audio channels based on the weighted combination of the first coherence prediction $\hat{C}_{1,b,m}^{(q)}$ and the second coherence prediction $\hat{C}_{2,b,m}$.

The storage medium 430 may also comprise persistent storage, which, for example, can be any single one or combination of magnetic memory, optical memory, solid state memory or even remotely mounted memory.

The receiving node 200b may further comprise a communications interface 420 for communications with a transmitting node 200a. As such the communications interface 420 may comprise one or more transmitters and receivers, comprising analogue and digital components.

The processing circuitry 410 controls the general operation of the receiving node 200b e.g. by sending data and control signals to the communications interface 420 and the storage medium 430, by receiving data and reports from the communications interface 420, and by retrieving data and instructions from the storage medium 430. Other components, as well as the related functionality, of the receiving node 200b are omitted in order not to obscure the concepts presented herein.

Figure 9:
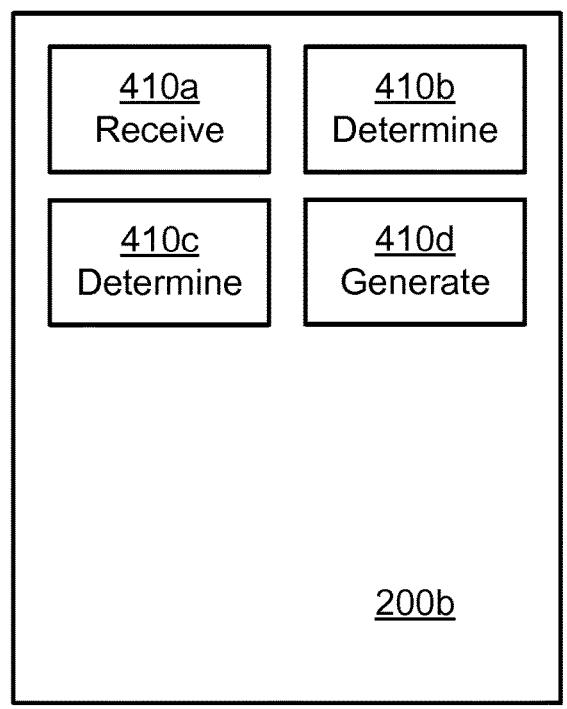
FIG. 9 is a schematic diagram showing functional modules of a receiving node according to an embodiment.

FIG. 9 schematically illustrates, in terms of a number of functional modules, the components of a receiving node 200b according to an embodiment. The receiving node 200b of FIG. 9 comprises a number of functional modules; a receive module 410a configured to perform step S202, a determine module 410b configured to perform step S204, a determine module 410c configured to perform step S206, and a generate module 410d configured to perform step S208. In some aspects the receive module 410a is further configured to perform any of steps S202a and S202b. In some aspects the generate module 410d is further configured to perform any of steps S208a and S208b. The receiving node 200b of FIG. 9 may further comprise a number of optional functional modules. In general terms, each functional module 410a-410d may be implemented in hardware or in software. Preferably, one or more or all functional modules 410a-410d may be implemented by the processing circuitry 410, possibly in cooperation with the communications interface 420 and/or the storage medium 430. The processing circuitry 410 may thus be arranged to from the storage medium 430 fetch instructions as provided by a functional module 410a-410d and to execute these instructions, thereby performing any steps of the receiving node 200b as disclosed herein.

The transmitting node 200a and/or the receiving node 200b may be provided as a standalone device or as a part of at least one further device. For example, as in the example of FIG. 1, in some aspects the transmitting node 200a is part of a radio transceiver device 200. Hence, in some aspects there is provided a radio transceiver device 200 comprising a transmitting node 200a and/or a receiving node 200b as herein disclosed.

Alternatively, functionality of the transmitting node 200a and/or the receiving node 200b may be distributed between at least two devices, or nodes. These at least two nodes, or devices, may either be part of the same network part or may be spread between at least two such network parts. Thus, a first portion of the instructions performed by the transmitting node 200a and/or the receiving node 200b may be executed in a first device, and a second portion of the of the instructions performed by the transmitting node 200a and/or the receiving node 200b may be executed in a second device; the herein disclosed embodiments are not limited to any particular number of devices on which the instructions performed by the transmitting node 200a and/or the receiving node 200b may be executed. Hence, the methods according to the herein disclosed embodiments are suitable to be performed by a transmitting node 200a and/or the receiving node 200b residing in a cloud computational environment. Therefore, although a single processing circuitry 210, 410 is illustrated in FIGS. 6 and 8 the processing circuitry 210, 410 may be distributed among a plurality of devices, or nodes. The same applies to the functional modules 210a-210e, 410a-410d of FIGS. 7 and 9 and the computer programs 1020a, 1020b of FIG. 10 (see below).

Figure 10:
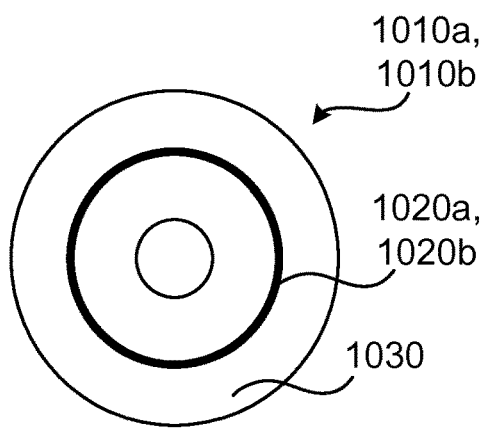
FIG. 10 shows one example of a computer program product comprising computer readable means according to an embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the transmitting node 200a as herein disclosed. On this computer readable means 1030, a computer program 1020b can be stored, which computer program 1020b can cause the processing circuitry 410 and thereto operatively coupled entities and devices, such as the communications interface 420 and the storage medium 430, to execute methods according to embodiments described herein. The computer program 1020b and/or computer program product 1010b may thus provide means for performing any steps of the receiving node 200b as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

Here now follows a set of example embodiments to further describe the concepts presented herein.

1. A method for supporting generation of comfort noise for at least two audio channels at a receiving node, the method being performed by a transmitting node, the method comprising:

determining a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor $\alpha$;

determining the weight factor $\alpha$ based on a bit-budget $B_m$ available for encoding a vector of spatial coherence values in each frame m; and signaling information about the weight factor $\alpha$ to the receiving node, for enabling the generation of the comfort noise for the at least two audio channels at the receiving node.

2. The method according to item 1, further comprising:
   determining spectral characteristics of the audio signals on the input audio channels; and
   signaling information about the spectral characteristics to the receiving node.

3. The method according to item 1, further comprising:
   determining a quantized prediction error per frame m and frequency band b by subtracting said at least one predicted spatial coherence value $\hat{C}_{pred,b,m}^{(q)}$ from the vector of spatial coherence values; and
   signaling information about the quantized prediction error to the receiving node.

4. The method according to item 1, wherein the weight factor $\alpha$ is determined by selecting a set of at least two candidate weight factors and performing trial encoding of the vector of spatial coherence values for each candidate weight factor.

5. The method according to item 4, wherein the trial encoding for each candidate weight factor yields a respective total number of encoded bits for the vector of spatial coherence values, and wherein the weight factor $\alpha$ is selected depending on whether the total number of encoded bits for the candidate weight factors fits within the bit-budget $B_{mm}$ or not.

6. The method according to item 1, wherein the first coherence prediction $\hat{C}_{1,b,m}^{(q)}$ is defined by an intra-frame prediction $\hat{C}_{intra,b,m}^{(q)}$ of the vector of spatial coherence values.

7. The method according to item 1, wherein the second prediction $\hat{C}_{2,b,m}$ is defined by an inter-frame coherence prediction $\hat{C}_{inter,b,m}$ of the vector of spatial coherence values.

8. The method according to items 6 and 7, wherein said at least one predicted spatial coherence value $\hat{C}_{b,m}^{(q)}$ is defined by a prediction value $\hat{C}_{pred,b,m}$.

9. The method according to item 8, wherein the prediction value $\hat{C}_{pred,b,m}^{(q)}$ is determined according to:

$\hat{C}_{pred,b,m}^{(q)} = \alpha \hat{C}_{intra,b,m} + (1-\alpha)\hat{C}_{inter,b,m}$.

10. The method according to items 5 and 9, wherein the weight factor $\alpha$ is selected as the largest candidate weight factor for which the total number of encoded bits fits within the bit-budget $B_m$.

11. The method according to items 5 and 9, wherein the weight factor $\alpha$ is selected as the candidate weight factor yielding fewest total number of encoded bits when the total number of encoded bits does not fit within the bit-budget $B_m$ for any of the candidate weight factors.

12. The method according to any of items 4, 5, 10 or 11, wherein the trial encoding is performed for two candidate weight factors $\alpha_{low}$, and $\alpha_{high}$, resulting in the number of bits $B_{currlow,m}$ and $B_{currhigh,m}$, respectively, needed for the encoding of the vector of spatial coherence values.

13. The method according to item 12, wherein the weight factor $\alpha$ is selected according to:

$$\alpha = \begin{cases} \alpha_{high}, & B_{currhigh,m} \leq B_m \\ \alpha_{low}, & B_{currlow,m} \leq B_m < B_{currhigh,m} \\ \text{argmin}(B_{curr,m}), & \min(B_{currlow,m}, B_{currhigh,m}) > B_m \end{cases}.$$

14. The method according to any of items 4, 5, 10, 11, 12, or 13, wherein which candidate weight factors to use during the trial encoding is based on the bit-budget $B_m$.

15. The method according to item 14, wherein the candidate weight factors are determined by means of performing a table lookup with the bit-budget $B_m$ as input or by inputting the bit-budget $B_m$ to a function.

16. The method according to item 15, wherein the table lookup is performed on table values obtained through training on a set of background noise.

17. A method for generation of comfort noise for at least two audio channels at a receiving node, the method being performed by the receiving node, the method comprising:
receiving information about a weight factor α from the transmitting node;
determining a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor α;
determining the weight factor α based on a bit-budget $B_m$ available for encoding a vector of spatial coherence values in each frame and the received information; and
generating comfort noise for the at least two audio channels based on the weighted combination of the first coherence prediction $\hat{C}_{1,b,m}^{(q)}$ and the second coherence prediction $\hat{C}_{2,b,m}$.

18. The method according to item 18, further comprising:
receiving information about spectral characteristics of the audio signals; and
generating the comfort noise also based on the information about the spectral characteristics 19. The method according to item 17, further comprising:
receiving information about a quantized prediction error per frame m and frequency band b; and
adding the quantized prediction error to the vector of spatial coherence values as part of generating the comfort noise.

20. The method according to item 17, wherein the weight factor α is determined by selecting a set of at least two candidate weight factors and using the received information about the weight factor α to select which candidate weight factors to use during trial encoding.

21. A transmitting node for supporting generation of comfort noise for at least two audio channels at a receiving node, the transmitting node comprising processing circuitry, the processing circuitry being configured to cause the transmitting node to:
determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor α;
determine the weight factor α based on a bit-budget $B_m$ available for encoding a vector of spatial coherence values in each frame m; and
signaling information about the weight factor α to the receiving node, for enabling the generation of the comfort noise for the at least two audio channels at the receiving node.

22. A transmitting node for supporting generation of comfort noise for at least two audio channels at a receiving node, the transmitting node comprising:
a determine module configured to determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor α;
a determine module configured to determine the weight factor α based on a bit-budget $B_m$ available for encoding a vector of spatial coherence values in each frame m; and
a signal module configured to signaling information about the weight factor α to the receiving node, for enabling the generation of the comfort noise for the at least two audio channels at the receiving node.

23. The transmitting node according to item 21 or 22, further being configured to perform the method according to any of items 2 to 16.

24. A receiving node for generation of comfort noise for at least two audio channels at the receiving node, the receiving node comprising processing circuitry, the processing circuitry being configured to cause the receiving node to:
receive information about a weight factor α from the transmitting node;
determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor α;
determine the weight factor α based on a bit-budget $B_m$ available for encoding a vector of spatial coherence values in each frame and the received information; and
generate comfort noise for the at least two audio channels based on the weighted combination of the first coherence prediction $\hat{C}_{1,b,m}^{(q)}$ and the second coherence prediction $\hat{C}_{2,b,m}$.

25. A receiving node for generation of comfort noise for at least two audio channels at the receiving node, the receiving node comprising:
a receive module configured to receive information about a weight factor α from the transmitting node;
a determine module configured to determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor $\alpha$;

a determine module configured to determine the weight factor $\alpha$ based on a bit-budget $B_m$ available for encoding a vector of spatial coherence values in each frame and the received information; and a generate module configured to generate comfort noise for the at least two audio channels based on the weighted combination of the first coherence prediction $\hat{C}_{1,b,m}^{(q)}$ and the second coherence prediction $\hat{C}_{2,b,m}$.

26. The receiving node according to item 24 or 25, further being configured to perform the method according to any of items 18 to 20

27. A radio transceiver device, the radio transceiver device comprising a transmitting node according to any of items 21 to 23, and/or a receiving node according to any of items 24 to 26.

28. A computer program for supporting generation of comfort noise for at least two audio channels at a receiving node, the computer program comprising computer code which, when run on processing circuitry (210) of a transmitting node, causes the transmitting node to:

determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor $\alpha$;

determine the weight factor $\alpha$ based on a bit-budget $B_m$ available for encoding a vector of spatial coherence values in each frame m; and signaling information about the weight factor $\alpha$ to the receiving node, for enabling the generation of the comfort noise for the at least two audio channels at the receiving node.

29. A computer program for generation of comfort noise for at least two audio channels at a receiving node, the computer program comprising computer code which, when run on processing circuitry of the receiving node, causes the receiving node to:

receive information about a weight factor $\alpha$ from the transmitting node;

determine a spatial coherence between audio signals on the respective audio channels, wherein at least one predicted spatial coherence value $\hat{C}_{pred,b,m}^{(q)}$ per frame m and frequency band b is determined to form a vector of predicted spatial coherence values, wherein the vector of predicted spatial coherence values is represented by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor $\alpha$;

determine the weight factor $\alpha$ based on a bit-budget $B_m$ available for encoding a vector of spatial coherence values in each frame and the received information; and generate comfort noise for the at least two audio channels based on the weighted combination of the first coherence prediction $\hat{C}_{1,b,m}^{(q)}$ and the second coherence prediction $\hat{C}_{2,b,m}$.

30. A computer program product comprising a computer program according to at least one of items 28 and 29, and a computer readable storage medium on which the computer program is stored.

Generally, all terms used in the example embodiments and appended claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

The inventive concept has mainly been described above with reference to a few embodiments. However, as is readily appreciated by a person skilled in the art, other embodiments than the ones disclosed above are equally possible within the scope of the inventive concept, as defined by the appended claims.

The invention claimed is:

1. A method for supporting generation of comfort noise for at least two audio channels at a receiving node, the method being performed by a transmitting node, the method comprising:

the transmitting node determining a spatial coherence between a first audio signal for a first audio channel and a second audio signal for a second audio channel, wherein at least one spatial coherence value $C_{b,m}$ per frame m and frequency band b is determined to form a vector of spatial coherence values, wherein a vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor $\alpha$;

the transmitting node determining the weight factor $\alpha$ based on a bit-budget $B_m$ that specifies a number of bits available for encoding the vector of spatial coherence values in each frame m; and the transmitting node signaling information about the weight factor $\alpha$ to the receiving node, for enabling the generation of the comfort noise for the at least two audio channels at the receiving node.

2. The method according to claim 1, wherein the first coherence prediction $\hat{C}_{1,b,m}^{(q)}$ is defined by an intra-frame prediction $\hat{C}_{intra,b,m}^{(q)}$ of the vector of spatial coherence values.

3. The method according to claim 2, wherein the second prediction $\hat{C}_{2,b,m}$ is defined by an inter-frame coherence prediction $\hat{C}_{inter,b,m}$ of the vector of spatial coherence values.

4. The method according to claim 3, wherein the predicted spatial coherence value $\hat{C}_{pred,b,m}^{(q)}$ is determined according to:

$$\hat{C}_{pred,b,m}^{(q)} = \alpha \hat{C}_{intra,b,m}^{(q)} + (1-\alpha)\hat{C}_{inter,b,m}.$$

5. The method according to claim 1, wherein the weight factor α is selected as the largest candidate weight factor for which the total number of encoded bits fits within the bit-budget $B_m$.

6. The method according to claim 1, wherein determining the weight factor α based on the bit-budget comprises:
   determining a set of two or more candidate weight factors based on the bit budget, wherein each said candidate weight factor yields a total number of encoded bits; and
   selecting from said set of candidate weight factors a candidate weight factor that yields the fewest total number of encoded bits, wherein
   the determined weight factor is the selected weight factor.

7. The method according to claim 1, wherein the weight factor α is determined by selecting a set of at least two candidate weight factors and performing trial encoding of the vector of spatial coherence values for each candidate weight factor.

8. The method according to claim 7, wherein the trial encoding for each candidate weight factor yields a respective total number of encoded bits for the vector of spatial coherence values, and wherein the weight factor α is selected depending on whether the total number of encoded bits for the candidate weight factors fits within the bit-budget $B_m$ or not.

9. The method according to claim 7, wherein the trial encoding is performed for two candidate weight factors $\alpha_{low}$ and $\alpha_{high}$, resulting in the number of bits $B_{currlow,m}$ and $B_{currhigh,m}$, respectively, needed for the encoding of the vector of spatial coherence values.

10. The method according to claim 9, wherein the weight factor α is selected according to:

$$\alpha = \begin{cases} \alpha_{high}, & B_{currhigh,m} \leq B_m \\ \alpha_{low}, & B_{currlow,m} \leq B_m < B_{currhigh,m} \\ \mathrm{argmin}(B_{curr,m}), & \min(B_{currlow,m}, B_{currhigh,m}) > B_m \end{cases}.$$

11. The method according to claim 7, wherein which candidate weight factors to use during the trial encoding is based on the bit-budget $B_m$.

12. The method according to claim 11, wherein the candidate weight factors are determined by means of performing a table lookup with the bit-budget $B_m$ as input or by inputting the bit-budget $B_m$ to a function.

13. The method according to claim 12, wherein the table lookup is performed on table values obtained through training on a set of background noise.

14. The method according to claim 1, further comprising:
   determining spectral characteristics of the audio signals on the input audio channels; and
   signaling information about the spectral characteristics to the receiving node.

15. The method according to claim 1, further comprising:
   determining a quantized prediction error per frame m and frequency band b by subtracting said at least one predicted spatial coherence value $\hat{C}_{pred,b,m}^{(q)}$ from the vector of spatial coherence values; and
   signaling information about the quantized prediction error to the receiving node.

16. A method for generation of comfort noise for at least two audio channels at a receiving node, the method being performed by the receiving node, the method comprising:
   the receiving node receiving information about a weight factor α from the transmitting node;
   the receiving node determining a spatial coherence between a first audio signal for a first audio channel and a second audio signal for a second audio channel, wherein at least one predicted spatial coherence value $\hat{C}_{pred,b,m}^{(q)}$ per frame m and frequency band b is determined to form a vector of predicted spatial coherence values, wherein the vector of predicted spatial coherence values is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor α;
   the receiving node determining the weight factor α based on a bit-budget $B_m$ that specifies a number of bits available for encoding a vector of spatial coherence values in each frame and the received information; and
   the receiving node generating comfort noise for the at least two audio channels based on the weighted combination of the first coherence prediction $\hat{C}_{1,b,m}^{(q)}$ and the second coherence prediction $\hat{C}_{2,b,m}$.

17. The method according to claim 16, wherein the weight factor α is determined by selecting a set of at least two candidate weight factors and using the received information about the weight factor α to select which candidate weight factors to use during trial encoding.

18. The method according to claim 16, further comprising:
   receiving information about spectral characteristics of the audio signals; and
   generating the comfort noise also based on the information about the spectral characteristics.

19. The method according to claim 16, further comprising:
   receiving information about a quantized prediction error per frame m and frequency band b; and
   adding the quantized prediction error to the vector of predicted spatial coherence values as part of generating the comfort noise.

20. A transmitting node for supporting generation of comfort noise for at least two audio channels at a receiving node, the transmitting node comprising processing circuitry, the processing circuitry being configured to cause the transmitting node to:
   determine a spatial coherence between a first audio signal for a first audio channel and a second audio signal for a second audio channel, wherein at least one spatial coherence value $C_{b,m}$ per frame m and frequency band b is determined to form a vector of spatial coherence values, wherein a vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor α;
   determine the weight factor α based on a bit-budget $B_m$ that specifies a number of bits available for encoding the vector of spatial coherence values in each frame m; and
   signaling information about the weight factor α to the receiving node, for enabling the generation of the comfort noise for the at least two audio channels at the receiving node.

21. A receiving node for generation of comfort noise for at least two audio channels at the receiving node, the receiving node comprising processing circuitry, the processing circuitry being configured to cause the receiving node to:

receive information about a weight factor α from the transmitting node;

determine a spatial coherence between a first audio signal for a first audio channel and a second audio signal for a second audio channel, wherein at least one predicted spatial coherence value $\hat{C}_{pred,b,m}^{(q)}$ per frame m and frequency band b is determined to form a vector of predicted spatial coherence values, wherein the vector of predicted spatial coherence values is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor α;

determine the weight factor α based on a bit-budget $B_m$ that specifies a number of bits available for encoding a vector of spatial coherence values in each frame and the received information; and generate comfort noise for the at least two audio channels based on the weighted combination of the first coherence prediction $\hat{C}_{1,b,m}^{(q)}$ and the second coherence prediction $\hat{C}_{2,b,m}$.

22. A computer program product comprising a non-transitory computer readable medium storing a computer program for supporting generation of comfort noise for at least two audio channels at a receiving node, the computer program comprising computer code which, when run on processing circuitry of a transmitting node, causes the transmitting node to:

determine a spatial coherence between a first audio signal for a first audio channel and a second audio signal for a second audio channel, wherein at least one spatial coherence value $C_{b,m}$ per frame m and frequency band b is determined to form a vector of spatial coherence values, wherein a vector of predicted spatial coherence values $\hat{C}_{pred,b,m}^{(q)}$ is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using a weight factor α;

determine the weight factor α based on a bit-budget $B_m$ that specifies a number of bits available for encoding the vector of spatial coherence values in each frame m; and signaling information about the weight factor α to the receiving node, for enabling the generation of the comfort noise for the at least two audio channels at the receiving node.

23. A computer program product comprising a non-transitory computer readable medium storing a computer program for generation of comfort noise for at least two audio channels at a receiving node, the computer program comprising computer code which, when run on processing circuitry of the receiving node, causes the receiving node to:

receive information about a weight factor a from the transmitting node;

determine a spatial coherence between a first audio signal for a first audio channel and a second audio signal for a second audio channel, wherein at least one predicted spatial coherence value $\hat{C}_{pred,b,m}^{(q)}$ per frame m and frequency band b is determined to form a vector of predicted spatial coherence values, wherein the vector of predicted spatial coherence values is formed by a weighted combination of a first coherence prediction $\hat{C}_{1,b,m}^{(q)}$ and a second coherence prediction $\hat{C}_{2,b,m}$, wherein the first coherence prediction $\hat{C}_{1,b,m}^{(q)}$ and the second coherence prediction $\hat{C}_{2,b,m}$ are combined using the weight factor α;

determine the weight factor α based on a bit-budget $B_m$ that specifies a number of bits available for encoding a vector of spatial coherence values in each frame and the received information; and generate comfort noise for the at least two audio channels based on the weighted combination of the first coherence prediction $\hat{C}_{1,b,m}^{(q)}$ and the second coherence prediction $\hat{C}_{2,b,m}$.

\* \* \* \* \*

UNITED STATES PATENT AND TRADEMARK OFFICE
CERTIFICATE OF CORRECTION

PATENT NO. : 11,495,237 B2
APPLICATION NO. : 17/044740
DATED : November 8, 2022
INVENTOR(S) : Norvell et al.

It is certified that error appears in the above-identified patent and that said Letters Patent is hereby corrected as shown below:

On the Title Page

In Item (57), under "ABSTRACT", in Column 2, Line 9, delete "weight factor a." and insert -- weight factor α. --, therefor.

In Item (57), under "ABSTRACT", in Column 2, Line 10, delete "weight factor a" and insert -- weight factor α --, therefor.

In the Specification

In Column 2, Line 24, delete "filler" and insert -- filter --, therefor.

In Column 3, Line 26, delete "$\hat{C}1,b,m^{(q)}$" and insert -- $\hat{C}_{1,b,m}^{(q)}$ --, therefor.

In Column 7, Line 24, delete "$C_{b,m}$, per" and insert -- $C_{b,m}$ per --, therefor.

In Column 8, Line 16, delete "l(m, n) , r(m, n)," and insert -- l(m, n), r(m, n), --, therefor.

In Column 9, Line 30, delete "filler" and insert -- filter --, therefor.

In Column 9, Line 48, delete "$\hat{C}_b$" and insert -- $\hat{C}_{b,m}$ --, therefor.

In Column 9, Line 62, delete "$\hat{C}_{intra,b,m}^{(q)}$." and insert -- $\hat{C}_{inter,b,m}$. --, therefor.

In Column 10, Line 2, delete "(0<α<1) ." and insert -- (0<α<1). --, therefor.

In Column 11, Line 9, delete "$B_m-B_{curr.m}$." and insert -- $B_m-B_{curr,m}$. --, therefor.

In Column 12, Line 15, delete "$\hat{C}_{intra,b,m}^{(q)}\Sigma_{i=1}^{b-1}p_{b,i}^{(q)}\hat{C}_{i,m}$." and insert -- $\hat{C}_{intra,b,m}^{(q)} = \Sigma_{i=1}^{b-1}p_{b,i}^{(q)}\hat{C}_{i,m}$. --, therefor.

Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,495,237 B2

In Column 12, Line 29, delete "20000a" and insert -- 200a --, therefor.

In Column 12, Line 65, delete "$C_{pred,b,m}^{(q)}$," and insert -- $\hat{C}_{pred,b,m}^{(q)}$, --, therefor.

In Column 13, Line 34, delete "$\hat{C}_{1,b,m}$" and insert -- $\hat{C}_{2,b,m}$ --, therefor.

In Columns 16 and 17, Lines 65-67 and 1-10, delete "the herein disclosed embodiments are not limited to any particular number of devices on which the instructions performed by the transmitting node 200a and/or the receiving node 200b may be executed. Hence, the methods according to the herein disclosed embodiments are suitable to be performed by a transmitting node 200a and/or the receiving node 200b residing in a cloud computational environment. Therefore, although a single processing circuitry 210, 410 is illustrated in FIGS. 6 and 8 the processing circuitry 210, 410 may be distributed among a plurality of devices, or nodes. The same applies to the functional modules 210a-210e, 410a-410d of FIGS. 7 and 9 and the computer programs 1020a, 1020b of FIG. 10 (see below)." and insert the same at Column 16, Line 64, after "device;" as a continuation paragraph.

In Column 18, Line 28, delete "$B_{mm}$" and insert -- $B_m$ --, therefor.

In Column 18, Line 42, delete "$\hat{C}_{pred,b,m}^{(q)} = \alpha \hat{C}_{intra,b,m} + (1-\alpha)\hat{C}_{inter,b,m}.$" and insert -- $\hat{C}_{pred,b,m}^{(q)} = \alpha \hat{C}_{intra,b,m}^{(q)} + (1-\alpha)\hat{C}_{inter,b,m}.$ --, therefor.

In Column 18, Line 53, delete "10" and insert -- 10, --, therefor.

In Column 18, Line 55, delete "$\alpha_{low}$," and insert -- $\alpha_{low}$ --, therefor.

In Column 19, Line 40, delete "characteristics" and insert -- characteristics. --, therefor.

In Column 21, Line 20, delete "20" and insert -- 20. --, therefor.

In the Claims

In Column 26, Line 16, in Claim 23, delete "factor a" and insert -- factor α --, therefor.